UNITED STATES PATENT OFFICE.

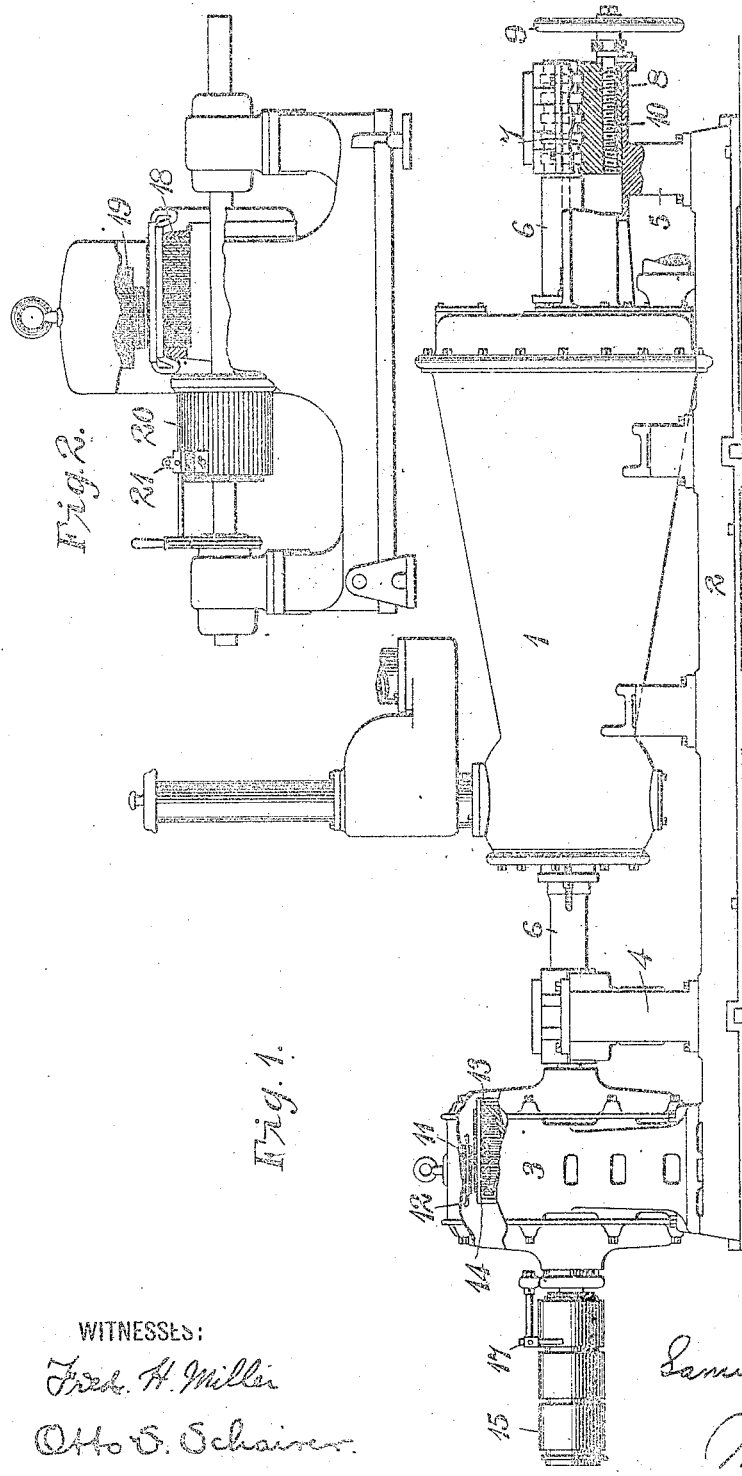

SAMUEL L. NICHOLSON, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRIC MOTOR.

No. 838,048.   Specification of Letters Patent.   Patented Dec. 11, 1906.

Application filed September 25, 1905. Serial No. 280,032.

*To all whom it may concern:*

Be it known that I, SAMUEL L. NICHOLSON, a citizen of the United States, and a resident of Pittsburg, in the county of Allegheny and State of Pennsylvania, have invented a new and useful Improvement in Electric Motors, of which the following is a specification.

My invention relates to electric motors; and it has for its object to provide a machine of this class which shall be adapted for longitudinal adjustment of one of its members with reference to the other without impairing its efficiency or materially affecting its operation as a motor.

In the accompanying drawings, Figure 1 is a view, partially in side elevation and partially in section, of an induction-motor and a Jordan engine directly coupled together, the motor being so designed and constructed as to embody my invention; and Fig. 2 is a view, partially in side elevation and partially in section, of a direct-current motor adapted for use in lieu of the alternating-current motor shown in Fig. 1.

The operation of Jordan engines for the grinding of wood-pulp to be used in the manufacture of paper involves a gradual and longitudinal adjustment of the rotating member of the engine as the pulp which is operated upon is disintegrated. Heretofore such engines have ordinarily been operated by steam-engines or water-wheels, to which they were mechanically connected by belt or other suitable gearing, and longitudinal adjustment of the rotating member has usually been effected by means of a suitable screw and hand-wheel.

In case the Jordan engine is operated by means of a motor directly connected thereto it obviously becomes necessary to either have a sliding connection between the motor and the shaft of the Jordan engine or the motor itself must be either wholly or partially adjustable with the shaft, which serves to connect its rotating member directly to the rotating member of the Jordan engine.

In order to effect the desired result, I propose to make one of the principal members of the motor of such greater length than the other member as to permit of the desired longitudinal adjustment without impairing the efficiency of the motor, and while either of the members may be made of greater length than the other I have here illustrated the secondary rotatable member as the one of greater length, this being generally preferable by reason of the fact that it is of less complicated and expensive construction than the primary stationary member.

While my invention is shown as applied to a Jordan engine, I desire it to be understood that it is more comprehensive in scope and that its use is not to be restricted to any specific service, provided its structural and functional characteristics adapt it to other uses.

Referring to Fig. 1 of the drawings, the Jordan engine 1 is shown as mounted upon a suitable base-plate 2, which also supports an induction-motor 3 and bearing blocks or pillars 4 and 5 for the shaft 6 of the rotating member (not shown) of the engine. Any suitable and approved means for effecting the desired longitudinal adjustment of the shaft 6 may be employed; but as one suitable means I have here shown the shaft as provided with a set of annular flanges or rings 7, which engage corresponding grooves in a block 8, that is mounted in suitable guideways in the bearing pillar or standard 5. This block 8 may be adjusted longitudinally by means of a hand-wheel 9 and a screw 10, as will be readily understood from the drawings without further description.

The motor 3 is provided with the usual stationary laminated core 11 and a winding 12, which may be connected to any suitable source of energy, (not shown,) and the rotatable secondary member comprises a suitable laminated core 13, which is mounted rigidly upon the shaft 6 and is provided with a suitable winding 14, the terminals of which are connected in the usual manner with collector-rings 15, that are mounted on the outer end of the shaft 6, the width of the rings being such that corresponding brushes 17 may remain in engagement therewith during longitudinal adjustment of the shaft.

It will be understood that any other suitable type of winding may be employed on the secondary member—such, for instance, as the familiar "squirrel-cage" type—and that the character of the motor may be otherwise modified from what is shown without departing from the invention.

If desired, a direct-current motor may be employed either the field-magnet or the armature-core of which is longer than the other, the motor shown in Fig. 2 being provided with an armature 18, that is longer than field-magnet polar projections 19, and a commutator 20, which is of such length as to permit of continuous engagement therewith of brushes 21 during longitudinal adjustment of the shaft.

The difference in length between the two members of the motor whether the motor be operated by direct currents or by alternating currents is preferably equal or substantially equal to the amount of longitudinal adjustment of the engine-shaft that is effected in order to secure the desired relation of the engine members.

I claim as my invention—

1. A dynamo-electric machine comprising cylindrical stationary and rotatable members having portions adapted to be actively inductive, one of which is of greater length than the other and is longitudinally adjustable with reference thereto.

2. A dynamo-electric machine comprising cylindrical stationary and rotatable members, one of which has a portion adapted to be actively inductive that is of materially greater length than the corresponding portion of the other, in combination with means for longitudinally adjusting one of the members.

3. A dynamo-electric machine comprising a stationary member, a cylindrical rotating member having a core of different length from that of the stationary member, and means for adjusting the longer member longitudinally with reference to the other.

4. The combination with an engine and a dynamo-electric machine the rotating members of which are directly coupled and the rotating member of the motor having a core of greater length than that of the stationary member, of means for effecting longitudinal adjustment of the rotating member.

5. The combination of a Jordan engine and means for effecting longitudinal adjustment of its shaft, of an electric motor having primary and secondary members, the cores of which are of unequal length, and having its secondary member directly coupled to the engine-shaft.

6. The combination with an electric motor having cylindrical stationary and rotatable members, the cores of which are of unequal length, of a shaft driven by said motor and means for effecting longitudinal adjustment of the shaft and the rotatable member of the motor.

7. A dynamo-electric machine comprising cylindrical stationary and rotatable members, the core of one of which is of materially greater length than that of the other, in combination with means for effecting longitudinal adjustment of one of the members within the limits of the core of the other.

8. A dynamo-electric machine comprising cylindrical stationary and rotatable members the core of the rotatable member of which is of materially greater length than that of the other, in combination with means for effecting longitudinal adjustment of the rotatable member within the limits of the core of the stationary member.

In testimony whereof I have hereunto subscribed my name this 19th day of September, 1905.

SAMUEL L. NICHOLSON.

Witnesses:
  E. T. COLEMAN,
  BIRNEY HINES.